US012652280B2

(12) United States Patent
Gean et al.

(10) Patent No.: US 12,652,280 B2
(45) Date of Patent: Jun. 9, 2026

(54) METHOD AND SYSTEM FOR IDENTITY AUTHENTICATION

(71) Applicant: JPMorgan Chase Bank, N.A., New York, NY (US)

(72) Inventors: Gerardo Gean, Plano, TX (US); Raghu Vudathu, Downingtown, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 257 days.

(21) Appl. No.: 17/980,775

(22) Filed: Nov. 4, 2022

(65) Prior Publication Data

US 2024/0154950 A1     May 9, 2024

(51) Int. Cl.
*H04L 9/40*          (2022.01)

(52) U.S. Cl.
CPC ........ *H04L 63/083* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 11,983,715 B1* | 5/2024 | Moinuddin | ...... G06Q 20/40145 |
| 2003/0172090 A1* | 9/2003 | Asunmaa | ................ H04L 63/06 |

| | | | |
|---|---|---|---|
| 2009/0181644 A1 | 7/2009 | Humphrey et al. | |
| 2012/0066740 A1 | 3/2012 | Doughty et al. | |
| 2012/0079581 A1* | 3/2012 | Patterson | ............ H04L 63/0861 726/7 |
| 2014/0006190 A1* | 1/2014 | Loomis, III | ........... G06Q 20/40 705/18 |
| 2018/0365689 A1 | 12/2018 | Gardiner et al. | |
| 2019/0207930 A1* | 7/2019 | Vendrow | ............ H04L 65/1066 |
| 2019/0386984 A1* | 12/2019 | Thakkar | .................. H04L 63/18 |
| 2021/0383479 A1* | 12/2021 | Syed | ....................... G10L 17/06 |

OTHER PUBLICATIONS

"I need help accessing my account username or password (FSA ID)," posted at < https://studentaid.gov/help-center/answers/article/help-accessing-account-fsa-id> on Aug. 22, 2022 (Year: 2022).*

(Continued)

*Primary Examiner* — Scott B Christensen
(74) *Attorney, Agent, or Firm* — GREENBLUM & BERNSTEIN, P.L.C.

(57) ABSTRACT

A method and a computing apparatus for authenticating an identification to prevent fraud are provided. The method includes: receiving a request for an interaction from a user; displaying a user interface that includes options for proving an identity of the user; receiving, from the user via the user interface, a selection of one of the options; accessing, from a card or a smart phone of the user, first information that corresponds to the selected option; retrieving, from an external database, second information that independently corresponds to the selected option; comparing the accessed first information with the retrieved second information; and determining whether to authenticate the identity of the user based on a result of the comparison.

9 Claims, 4 Drawing Sheets

(56) References Cited

OTHER PUBLICATIONS

"Recovering an Applicant User Name and Password in TAM," posted at < https://kb.uwss.wisconsin.edu/page.php?id=81438> on Aug. 7, 2020 (TAM) (Year: 2020).*

"Forgot/Unlock Login," posted at < https://www.robinsfcu.org/guide/1/en/topic/forgotten-username> on Sep. 23, 2020 (RobinsFCU) (Year: 2020).*

International Search Report and Written Opinion in International Application No. PCT/US2023/076070, dated Mar. 20, 2024.

* cited by examiner

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

400

METHOD AND SYSTEM FOR IDENTITY AUTHENTICATION

BACKGROUND

1. Field of the Disclosure

This technology generally relates to methods and systems for identity authentication, and more particularly to methods and systems for providing a digital identity proofing mechanism for authentication of personal identity in order to facilitate provision of services and execution of transactions with a high level of confidence.

1. BACKGROUND INFORMATION

Currently, there is a high rate of occurrence of scams and fraud across the world, especially in the online world of cyberspace. As a result, many service providers and institutions that execute transactions with individual customers are interested in ensuring the identity of each customer in advance of a provision of a service and/or an execution of a transaction.

Accordingly, there is a need for a method and a system for providing a digital identity proofing mechanism for authentication of personal identity in order to facilitate provision of services and execution of transactions with a high level of confidence.

SUMMARY

The present disclosure, through one or more of its various aspects, embodiments, and/or specific features or sub-components, provides, inter alia, various systems, servers, devices, methods, media, programs, and platforms for providing a digital identity proofing mechanism for authentication of personal identity in order to facilitate provision of services and execution of transactions with a high level of confidence.

According to an aspect of the present disclosure, a method for authenticating an identification is provided. The method is implemented by at least one processor. The method includes: receiving, by the at least one processor from a user, a request for an interaction; displaying, by the at least one processor, a user interface that includes a plurality of options for proving an identity of the user; receiving, by the at least one processor from the user via the user interface, a selection of one of the plurality of options; accessing, by the at least one processor from the user, first information that corresponds to the selected option; retrieving, by the at least one processor from a database, second information that corresponds to the selected option; comparing, by the at least one processor, the accessed first information with the retrieved second information; and determining, by the at least one processor, whether to authenticate the identity of the user based on a result of the comparing.

The accessing of the first information may include extracting the first information from a card that electronically stores the first information.

The method may further include receiving a code from the user. The card may be configured to control the accessing of the first information based on whether the received code matches with a predetermined personal identification number (PIN).

The first information may include at least one from among a name of the user, a home address of the user, a date of birth of the user, an email address of the user, a telephone number of the user, an account number associated with the user, and an answer to a predetermined security question associated with the user.

An access to the database may be controlled by a financial institution that administers an account associated with the user.

The accessing of the first information may include extracting the first information from a smart phone that electronically stores the first information.

According to another aspect of the present disclosure, a computing apparatus for authenticating an identification is provided. The computing apparatus includes a processor; a memory; and a communication interface coupled to each of the processor and the memory. The processor is configured to: receive, from a user via the communication interface, a request for an interaction; display a user interface that includes a plurality of options for proving an identity of the user; receive, from the user via the user interface, a selection of one of the plurality of options; access, from the user, first information that corresponds to the selected option; retrieve, from an external database, second information that corresponds to the selected option; compare the accessed first information with the retrieved second information; and determine whether to authenticate the identity of the user based on a result of the comparison.

The processor may be further configured to access the first information by extracting the first information from a card that electronically stores the first information.

The processor may be further configured to receive a code from the user via the communication interface. The card may be configured to control the accessing of the first information based on whether the received code matches with a predetermined personal identification number (PIN).

The first information may include at least one from among a name of the user, a home address of the user, a date of birth of the user, an email address of the user, a telephone number of the user, an account number associated with the user, and an answer to a predetermined security question associated with the user.

An access to the external database may be controlled by a financial institution that administers an account associated with the user.

The processor may be further configured to access the first information by extracting the first information from a smart phone that electronically stores the first information.

According to yet another aspect of the present disclosure, a card is provided. The card includes: a processor configured to facilitate a communication with a point-of-sale device; and an electronic storage mechanism configured to store first information that relates to an identity of a user of the card. The processor is further configured to: transmit, to the point-of-sale device, a request for an interaction; receive, from the point-of-sale device, a request for a subset of the first information; and transmit, to the point-of-sale device, the requested subset of the first information.

The electronic storage mechanism may include a magnetic stripe. The processor may be further configured to facilitate the communication with the point-of-sale device when the card is swiped through a reader that is connected to the point-of-sale device.

The electronic storage mechanism may include an electronic chip that is embedded in the card. The processor may be further configured to facilitate the communication with the point-of-sale device when a portion of the card that includes the embedded electronic chip is inserted into a reader that is connected to the point-of-sale device.

The processor may be further configured to: receive, from the user via the point-of-sale device, a code; compare the received code with a personal identification number (PIN) that is stored in the electronic storage mechanism; and control the accessing of the requested subset of the first information based on a result of the comparison.

The first information may include at least one from among a name of the user, a home address of the user, a date of birth of the user, an email address of the user, a telephone number of the user, an account number associated with the user, and an answer to a predetermined security question associated with the user.

The point-of-sale device may include at least one from among a conventional point-of-sale terminal, a dongle that is attachable to an electronic device that includes at least one from among a smart phone, a tablet, and a computer terminal, and a biometric device that is configured to recognize a user via at least one from among a fingerprint, a thumb print, a palm, an iris recognition, and a facial recognition.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
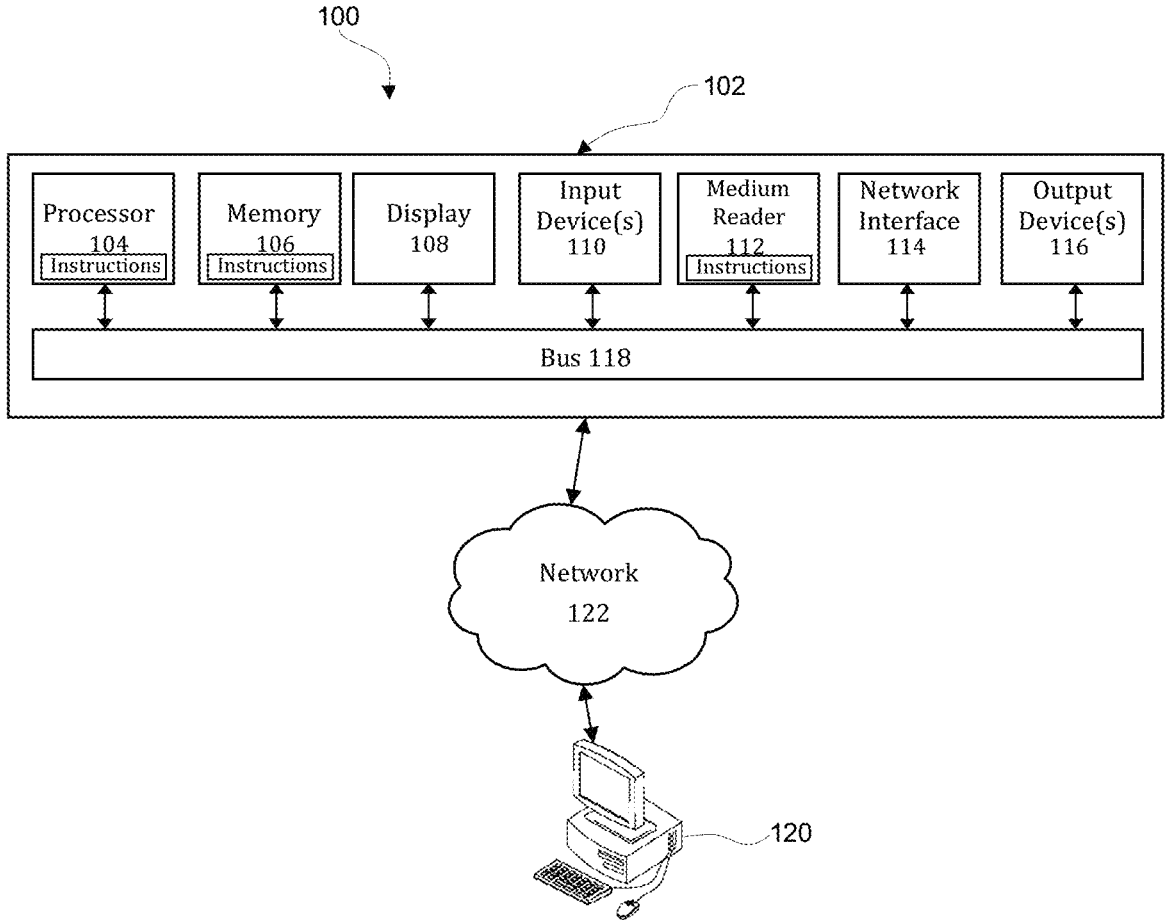
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a digital identity proofing mechanism for authentication of personal identity in order to facilitate provision of services and execution of transactions with a high level of confidence.

Figure 2:
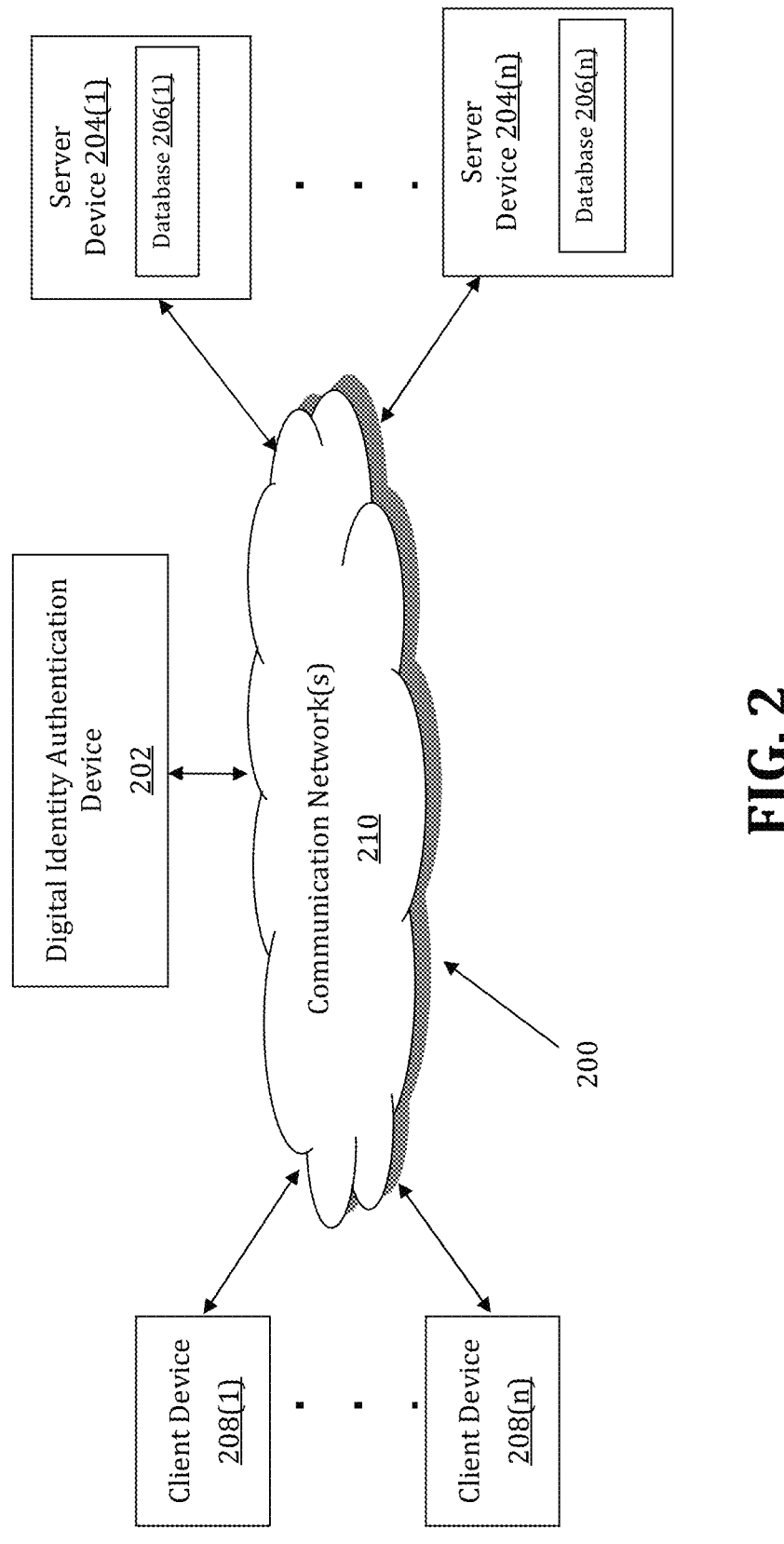
FIG. 2 illustrates an exemplary diagram of a network environment.

Referring to FIG. 2, a schematic of an exemplary network environment 200 for implementing a method for providing a digital identity proofing mechanism for authentication of personal identity in order to facilitate provision of services and execution of transactions with a high level of confidence is illustrated. In an exemplary embodiment, the method is executable on any networked computer platform, such as, for example, a personal computer (PC).

The method for providing a digital identity proofing mechanism for authentication of personal identity in order to facilitate provision of services and execution of transactions with a high level of confidence may be implemented by a Digital Identity Authentication (DIA) device 202. The DIA device 202 may be the same or similar to the computer system 102 as described with respect to FIG. 1. The DIA device 202 may store one or more applications that can include executable instructions that, when executed by the DIA device 202, cause the DIA device 202 to perform actions, such as to transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DIA device 202 itself, may be located in virtual server(s) running in a cloud-based computing environment rather than being tied to one or more specific physical network computing devices. Also, the application(s) may be running in one or more virtual machines (VMs) executing on the DIA device 202. Additionally, in one or more embodiments of this technology, virtual machine(s) running on the DIA device 202 may be managed or supervised by a hypervisor.

In the network environment 200 of FIG. 2, the DIA device 202 is coupled to a plurality of server devices 204(1)-204(n) that hosts a plurality of databases 206(1)-206(n), and also to a plurality of client devices 208(1)-208(n) via communication network(s) 210. A communication interface of the DIA device 202, such as the network interface 114 of the computer system 102 of FIG. 1, operatively couples and communicates between the DIA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DIA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DIA devices that efficiently implement a method for providing a digital identity proofing mechanism for authentication of personal identity in order to facilitate provision of services and execution of transactions with a high level of confidence.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DIA device 202 may be a standalone device or integrated with one or more other devices or apparatuses, such as one or more of the server devices 204(1)-204(n), for example. In one particular example, the DIA device 202 may include or be hosted by one of the server devices 204(1)-204(n), and other arrangements are also possible. Moreover, one or more of the devices of the DIA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DIA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to customer-specific personal identification information and customer account data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DIA device 202 via communication network(s) 210. Accordingly, the client devices 208(1)-208(n) may be mobile computing devices, desktop computing devices, virtual computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DIA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DIA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DIA device 202, the server devices 204(1)-204(n), or the client devices 208(1)-208(n), for example, may be configured to operate as virtual instances on the same physical machine. In other words, one or more of the DIA device 202, the server devices 204(1)-204(n), or the client devices 208(1)-208(n) may operate on the same physical device rather than as separate devices communicating through communication network(s) 210. Additionally, there may be more or fewer DIA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
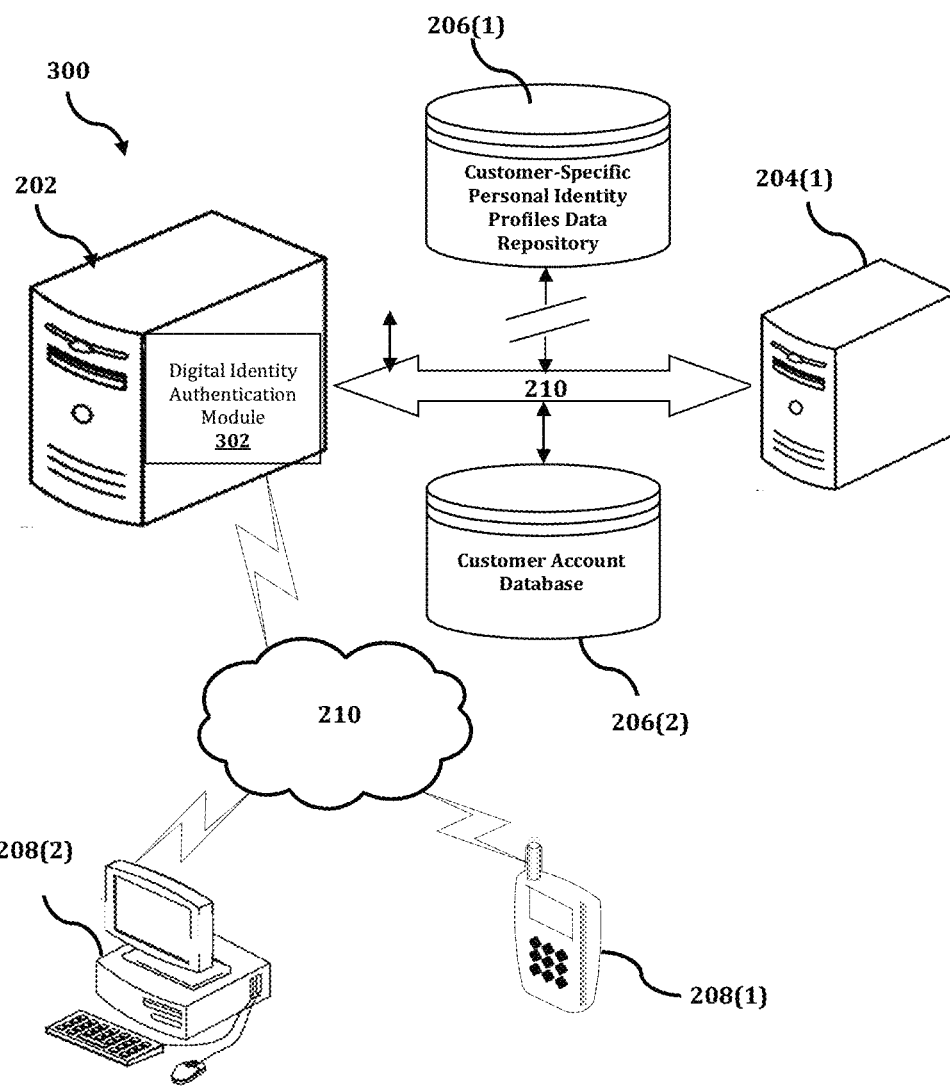
FIG. 3 shows an exemplary system for implementing a method for providing a digital identity proofing mechanism for authentication of personal identity in order to facilitate provision of services and execution of transactions with a high level of confidence.

The DIA device 202 is described and illustrated in FIG. 3 as including a digital identity authentication module 302, although it may include other rules, policies, modules, databases, or applications, for example. As will be described below, the digital identity authentication module 302 is configured to implement a method for providing a digital identity proofing mechanism for authentication of personal identity in order to facilitate provision of services and execution of transactions with a high level of confidence.

An exemplary process 300 for implementing a mechanism for providing a digital identity proofing mechanism for authentication of personal identity in order to facilitate provision of services and execution of transactions with a high level of confidence by utilizing the network environment of FIG. 2 is illustrated as being executed in FIG. 3. Specifically, a first client device 208(1) and a second client device 208(2) are illustrated as being in communication with DIA device 202. In this regard, the first client device 208(1) and the second client device 208(2) may be "clients" of the DIA device 202 and are described herein as such. Nevertheless, it is to be known and understood that the first client device 208(1) and/or the second client device 208(2) need not necessarily be "clients" of the DIA device 202, or any entity described in association therewith herein. Any additional or alternative relationship may exist between either or both of the first client device 208(1) and the second client device 208(2) and the DIA device 202, or no relationship may exist.

Further, DIA device 202 is illustrated as being able to access a customer-specific personal identity profiles data repository 206(1) and a customer account database 206(2). The digital identity authentication module 302 may be configured to access these databases for implementing a method for providing a digital identity proofing mechanism for authentication of personal identity in order to facilitate provision of services and execution of transactions with a high level of confidence.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DIA device 202 via broadband or cellular communication. Of course, these embodiments are merely exemplary and are not limiting or exhaustive.

Upon being started, the digital identity authentication module 302 executes a process for providing a digital identity proofing mechanism for authentication of personal identity in order to facilitate provision of services and execution of transactions with a high level of confidence. An exemplary process for providing a digital identity proofing mechanism for authentication of personal identity in order to facilitate provision of services and execution of transactions with a high level of confidence is generally indicated at flowchart 400 in FIG. 4.

Figure 4:
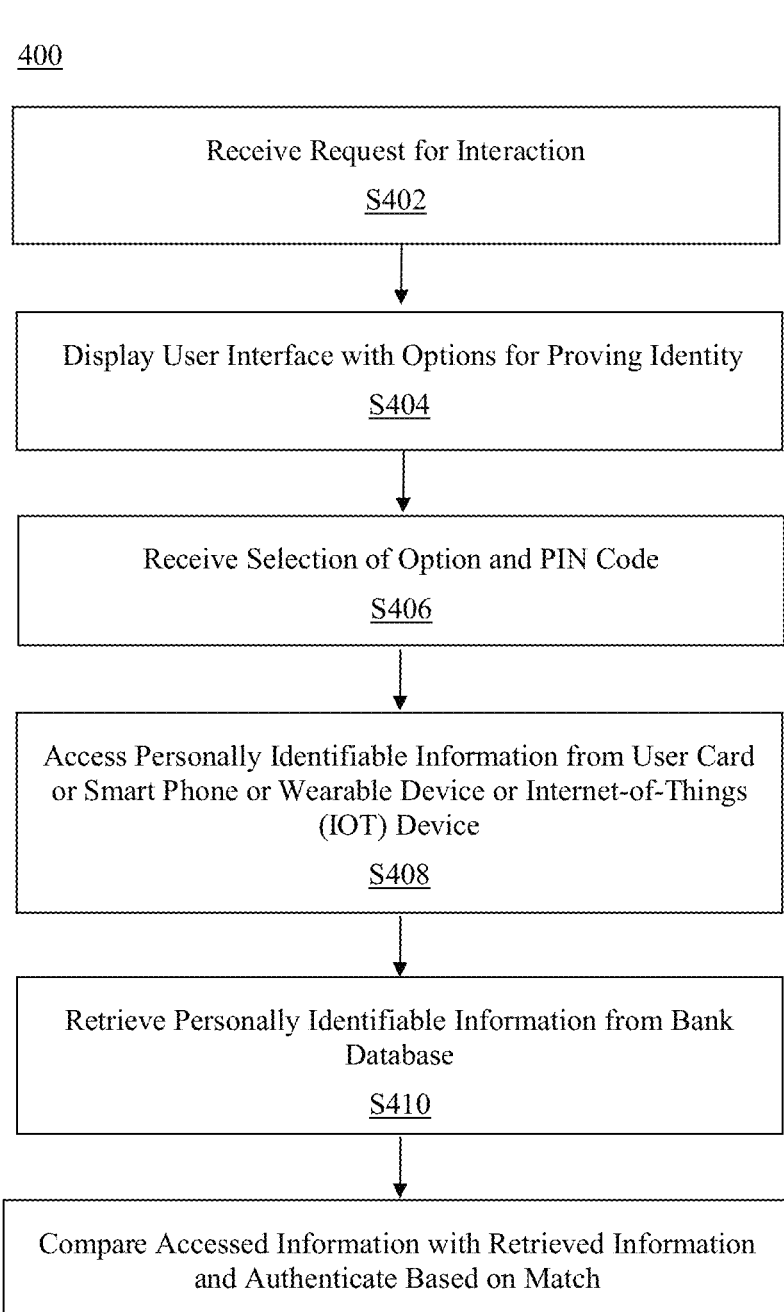
FIG. 4 is a flowchart of an exemplary process for implementing a method for providing a digital identity proofing mechanism for authentication of personal identity in order to facilitate provision of services and execution of transactions with a high level of confidence.

In process 400 of FIG. 4, at step S402, the digital identity authentication module 302 receives a request for an interaction from a user. In an exemplary embodiment, the request for an interaction may include a service request or a request to execute a transaction, such as a commercial transaction between a merchant and a customer. In this aspect, the digital identity authentication module 302 may be in communication with or installed in a point-of-sale machine that is controlled by the merchant.

At step S404, the digital identity authentication module 302 displays a user interface that includes a plurality of options for proving an identity of the user. In an exemplary embodiment, the options may include providing various types of personally identifiable information, such as, for example, a name of the user, a home address of the user, a date of birth of the user, an email address of the user, a telephone number of the user, an account number associated with the user, an answer to a predetermined security question associated with the user, and/or any other specific type of information that would be usable for proving the identity of the user.

At step S406, the digital identity authentication module 302 receives a selection of one of the options from the user. Then, at step S408, the digital identity authentication module 302 accesses information provided by the user that corresponds to the selected option. In an exemplary embodiment, the information may be extracted from a card that is in the possession of the user and that stores the information electronically in a magnetic stripe or an electronic chip that is embedded in the card. In this scenario, the point-of-sale machine may be configured to enable the card to be swiped through a reader or inserted into a reader in order to facilitate the extraction of the information. In an alternative embodiment, the information may be accessed from a smart phone of the user. In this latter scenario, the point-of-sale machine may be configured to facilitate a communication with the smart phone via a near-field communication (NFC) mechanism or via any other mechanism that is suitable for facilitating such a communication. In another alternative embodiment, the information may be accessed from a wearable device or an Internet-of-Things (IOT) device of the user.

In an exemplary embodiment, the ability to access the information from the user's card may be controlled by a personal identification number (PIN), in order to ensure that the card is not being used by a person that is not authorized to use the card. In this scenario, when the digital identity authentication module 302 receives the user selection in step S406, and prior to attempting to access the information stored in the card, the user may be prompted to provide a code, and then the digital identity authentication module 302 compares the code entered by the user with the PIN that is stored on the card. If there is a match, then the card allows the personally identifiable information that is stored on the card to be extracted by the digital identity authentication module 302 in step S408.

At step S410, the digital identity authentication module 302 retrieves information that corresponds to the option selected by the user in step S406 from an external database that independently stores the personally identifiable information of the user. In an exemplary embodiment, the exterpersonally identifiable information (PII) of the customer on the back-end system. If the same customer has more than one credit card(s) or debit card(s), each card has a unique identifier that represents the customer, which is embedded into the magnetic strip of the card. This is something of which the customer is generally unaware, and there is no need for the customer to remember or be aware of this. Further, when the payment instrument/device is lost, stolen, misplaced, replaced, upgraded, traded, or swapped out in any way, the replacement will be assigned a different unique identifier. In this aspect, the unique identifier is immutable and is intended to be associated with only one payment instrument and not be used with any other payment instrument.

In an exemplary embodiment, when the physical card is manufactured, the unique identifier is embedded into the magnetic strip. Table 1 illustrates an example of a relationship between the unique identifier, the customer identifier, and the card number:

TABLE 1

| Customer ID | Card Number | Unique Identifier |
|---|---|---|
| Cust ID 1 | Credit1# . . . 1234 | 228542ce-9aea-4f43-8021-ac540354b9d7 |
| Cust ID 1 | Credit2# . . . 2345 | c601274c-fdf8-462a-9c48-3c722912b67a |
| Cust ID 1 | Debit1# . . . 3456 | 782f21da-2a81-4f34-bb52-1423154cb56c |

In an exemplary embodiment, the unique identifier is mapped to the PIN and the information that is accessible when the PIN is provided. Table 2 provides an example in which the same unique identifier is associated with two separate PINs, and depending on which PIN is used by the customer, the relevant information is accessible:

TABLE 2

| Unique Identifier | PIN | Data Type #1 | Data Type #2 | Data Type #3 | Data Type #4 |
|---|---|---|---|---|---|
| 228542ce-9aea-4f43-8021-ac540354b9d7 | 2345 | First Name: John | Last Name: Doe | SSN#: 123-45-6789 | DOB# Jan. 2, 1950 |
| 228542ce-9aea-4f43-8021-ac540354b9d7 | 2346 | First Name: John | Last Name: Doe | Address: Jane Street, MyTown, ST, 12345 | Driver License #: 23456943 | nal database may be controlled by a financial institution, such as a bank, that administers an account that is associated with the user.

At step S412, the digital identity authentication module 302 compares the information retrieved in step S410 with the information extracted in step S408, and then determines whether to authenticate the identity of the user based on a result of the comparison. If there is not a match, then the digital identity authentication module 302 indicates that there is a discrepancy and that the identity of the user has not been proven. If there is a match, then the digital identity authentication module 302 authenticates the identity of the user and enables the requested interaction to proceed.

In an exemplary embodiment, each card is assigned a unique identifier, such as, for example, an alphanumeric 64-character string, an alphanumeric 128-character string, or a similar type of identifier. The identifier is mapped to the payment instrument/device (e.g., credit card, debit card, physical device, etc.), which is in turn mapped to the In an exemplary embodiment, a single PIN may be assigned for all of the PII. In another exemplary embodiment, a separate PIN may be assigned for each item of PII, or a separate PIN may be assigned for a specific group of parameters. In this aspect, a user is provided with an ability to set up multiple PINs as desired, depending on the use case, the context, or the specific implementation.

In an exemplary embodiment, a customer may initiate an interaction by swiping a card at a point-of-sale terminal and entering a PIN. The customer may then manually enter the PII information, such as, for example, a social security number, on the point-of-sale terminal, which then retrieves the unique identifier from the card and transmits the PIN, the PII, and the unique identifier to a back-end server in order to validate whether the unique identifier matches the social security number entered by the user entered, and to check whether the information is accurate. If all the information matches, then the back-end server returns a Boolean response "Yes," and if there is a mismatch, the back-end server returns a "No" response. In this example, the PII is not shared with the requesting party; instead, only a Boolean Yes/No type of response is provided. In other scenarios, the back-end server may send the actual PII merchant information back to the requesting party. In this aspect, the customer is able to control which PII data elements are to be shared with merchants and/or partners via a user interface provided by the customer's bank or financial institution or via a third party provider that is working together with the customer's bank or financial institution. The customer is also able to decide to start, stop, pause, and/or resume the sharing of any such PII data with merchants/and/or partners at any time.

In an exemplary embodiment, the term "point-of-sale device" is used generically to refer to any type of device that is designed to interact with a card of a user. In particular, as referred to herein, a point-of-sale device may include any one or more of a conventional point-of-sale terminal, a dongle that is attachable to electronic devices such as smart phones, tablets, or computers, and/or a biometric device that is designed to recognize a user via any one or more of a fingerprint, a thumb print, palm, iris recognition, facial recognition, and/or any other suitable mechanism for identifying a person via biometric information.

Accordingly, with this technology, an optimized process for providing a digital identity proofing mechanism for authentication of personal identity in order to facilitate provision of services and execution of transactions with a high level of confidence is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for authenticating an identification, the method being implemented by at least one processor, the method comprising:

receiving, by the at least one processor from a user, a request for an interaction;

displaying, by the at least one processor, a user interface that includes a plurality of user-selectable options for proving an identity of the user;

receiving, by the at least one processor from the user via the user interface, a selection of one of the plurality of user-selectable options;

accessing, by the at least one processor from the user, first information that corresponds to the selected option;

retrieving, by the at least one processor from a database, second information that corresponds to the selected option;

comparing, by the at least one processor, the accessed first information with the retrieved second information; and determining, by the at least one processor, whether to authenticate the identity of the user based on a result of the comparing, wherein the plurality of user-selectable options includes each of a name of the user, a home address of the user, a date of birth of the user, an email address of the user, a telephone number of the user, an account number associated with the user, and an answer to a predetermined security question associated with the user, and wherein the accessing of the first information comprises extracting the first information from a card that is associated with the user and that is assigned a unique identifier that is associated with each of a first personal identification number (PIN) that is usable for accessing a first subset of the first information and a second PIN that is usable for accessing a second subset of the first information.

2. The method of claim 1, wherein the first information includes at least one from among the name of the user, the home address of the user, the date of birth of the user, the email address of the user, the telephone number of the user, the account number associated with the user, and the answer to the predetermined security question associated with the user.

3. The method of claim 1, wherein an access to the database is controlled by a financial institution that administers an account associated with the user.

4. A computing apparatus for authenticating an identification, the computing apparatus comprising:

a processor;

a memory; and a communication interface coupled to each of the processor and the memory, wherein the processor is configured to:

receive, from a user via the communication interface, a request for an interaction;

display a user interface that includes a plurality of user-selectable options for proving an identity of the user;

receive, from the user via the user interface, a selection of one of the plurality of user-selectable options;

access, from the user, first information that corresponds to the selected option;

retrieve, from an external database, second information that corresponds to the selected option;

compare the accessed first information with the retrieved second information; and determine whether to authenticate the identity of the user based on a result of the comparison, wherein the plurality of user-selectable options includes each of a name of the user, a home address of the user, a date of birth of the user, an email address of the user, a telephone number of the user, an account number associated with the user, and an answer to a predetermined security question associated with the user, and wherein the accessing of the first information comprises extracting the first information from a card that is associated with the user and that is assigned a unique identifier that is associated with each of a first personal identification number (PIN) that is usable for accessing a first subset of the first information and a second PIN that is usable for accessing a second subset of the first information.

5. The computing apparatus of claim 4, wherein the first information includes at least one from among the name of the user, the home address of the user, the date of birth of the user, the email address of the user, the telephone number of the user, the account number associated with the user, and the answer to the predetermined security question associated with the user.

6. The computing apparatus of claim 4, wherein an access to the external database is controlled by a financial institution that administers an account associated with the user.

7. A card, comprising:

a processor configured to facilitate a communication with a point-of-sale device; and an electronic storage mechanism configured to store first information that relates to an identity of a user of the card, wherein the processor is further configured to:

transmit, to the point-of-sale device, a request for an interaction;

receive, from the point-of-sale device, a request for at least one information item included in the first information; and transmit, to the point-of-sale device, the requested at least one information item, wherein the card is usable for initiating an identity authentication operation for enabling the interaction to proceed based on the first information, and wherein the first information includes at least one from among a home address of the user, a date of birth of the user, an account number associated with the user, and an answer to a predetermined security question associated with the user, and wherein the card is assigned a unique identifier that is associated with each of a first personal identification number (PIN) that is usable for accessing a first subset of the first information and a second PIN that is usable for accessing a second subset of the first information, and wherein the processor is further configured to: after the receiving of the request and before the transmitting of the at least one information item, when the at least one information item is included in the first subset, extract the at least one information item when the request includes the first PIN, and when the at least one information item is included in the second subset, extract the at least one information item when the request includes the second PIN and the second PIN.

8. The card of claim 7, wherein the electronic storage mechanism includes an electronic chip that is embedded in the card, and wherein the processor is further configured to facilitate the communication with the point-of-sale device when a portion of the card that includes the embedded electronic chip is inserted into a reader that is connected to the point-of-sale device.

9. The card of claim 7, wherein the point-of-sale device comprises at least one from among a conventional point-of-sale terminal, a dongle that is attachable to an electronic device that includes at least one from among a smart phone, a tablet, and a computer terminal, and a biometric device that is configured to recognize a user via at least one from among a fingerprint, a thumb print, a palm, an iris recognition, and a facial recognition.

\* \* \* \* \*